(12) United States Patent
Touge (10) Patent No.: US 6,250,157 B1
(45) Date of Patent: Jun. 26, 2001

(54) ANGULAR RATE SENSOR (75) Inventor: Hiroshi Touge, Ichinomiya (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 0 days.

(21) Appl. No.: 09/337,413

(22) Filed: Jun. 22, 1999

(30) Foreign Application Priority Data

Jun. 22, 1998 (JP) ................................................. 10-174581

(51) Int. Cl.[7] .................................................. G01P 9/04
(52) U.S. Cl. ................................................... 73/504.12
(58) Field of Search ........................ 73/504.04, 504.03, 73/504.08, 504.02, 504.12, 514.29, 514.37, 514.38, 514.32, 514.16, 862.59, 862.626; 310/308, 309, 338

(56) References Cited

U.S. PATENT DOCUMENTS

| 5,349,855 | 9/1994 | Bernstein et al. | 73/505 |
|---|---|---|---|
| 5,359,893 | * 11/1994 | Dunn | 73/504.12 |
| 5,635,638 | 6/1997 | Geen | 73/504.04 |
| 5,635,640 | * 6/1997 | Geen | 73/504.12 |
| 5,872,313 | * 2/1999 | Zarabadi et al. | 73/504.12 |
| 6,062,082 | * 5/2000 | Guenther et al. | 73/504.12 |

FOREIGN PATENT DOCUMENTS

| 862048 | 9/1998 | (EP) . |
|---|---|---|
| 2320571 | 6/1998 | (GB) . |
| 5-248872 | 9/1993 | (JP) . |
| 8-152327 | 6/1996 | (JP) . |
| 9-127148 | 5/1997 | (JP) . |
| 98/37380 | 8/1998 | (WO) . |

* cited by examiner

Primary Examiner—Helen Kwok
(74) Attorney, Agent, or Firm—Burns, Doane, Swecker & Mathis, LLP (57) ABSTRACT

An angular rate sensor has a pair of masses located symmetrically with respect to a point on the xy-plane, a support beam connected to each of the masses so as to be substantially movable in a direction, a center anchor supporting the support beam at the point, a floating body having a plurality of slits and located symmetrically with respect to the point, and a pair of displacement detecting elements located in the slits to detect rotational vibration about the point when an angular rate occurs. A connecting beam is located symmetrically with respect to the point, and driving electrodes vibrate in an anti-phase manner.

11 Claims, 4 Drawing Sheets

ANGULAR RATE SENSOR

This application corresponds to and claims priority under 35 U.S.C. § 119 with respect to Japanese Application No. 10(1998)-174581 filed on Jun. 22, 1998, the entire content of which is incorporated herein by reference.

FIELD OF THE INVENTION

The present invention generally relates to a sensor. More particularly, the present invention pertains to an angular rate sensor having a mass supported by a substrate in a floating manner.

BACKGROUND OF THE INVENTION

One known type of angular rate sensor includes two suspended masses, each having one set of floating comb finger electrodes at its left-side and its right-side positions (left-side floating comb finger electrodes and right-side floating comb finger electrodes). Two sets of fixed comb finger electrodes are also provided, that is left-side fixed comb finger electrodes and right-side fixed comb finger electrodes. Each set of the fixed comb finger electrodes is interdigitated, in a parallel manner with a corresponding set of the floating comb electrodes so as not to contact the latter. The mass is vibrated in the x-direction by applying voltages alternately between the left-side floating comb finger electrodes and the left-side fixed comb finger electrodes, and between the right-side floating comb finger electrodes and the right-side fixed comb finger electrodes. When an angular rate of rotation about the z-axis is applied to the mass in a driving mode (which the masses are vibrating in an anti-phase manner), the mass receives a Coriolis force. The mass thus comes to vibrate also in the y-direction (elliptical vibration). Where the mass is a conductor or is formed by joining electrodes and a detection electrode is provided on a substrate so as to be parallel with the xz-plane of the mass, the capacitance between the detection electrode and the mass vibrates or varies so as to correspond to the y-component (angular rate component) of the elliptical vibration. A magnitude of the angular rate may be determined by measuring the vibration or variation of the capacitance. Reference is made to Japanese Patent Laid Open No. Hei. 5-248872 and Japanese Patent Application Nos. Hei. 8-152327 and Hei. 9.127148 which disclose sensors along the lines described above.

U.S. Pat. No. 5,635,638 discloses a micro-machined device having two suspended masses positioned near each other, with each of the masses being dithered along a dither axis. Two couplings, each including an arcuate member and an anchored support beam, are provided between the masses to allow relative anti-phase movement and resist relative in-phase movement. The coupling extends around a region intermediate the masses where a dither detection device is disposed.

In FIG. 4 of U.S. Pat. No. 5,635,638, the micro-machined sensor has a pair of masses, a plurality of beams connecting each of the masses and supporting the masses in a floating manner at an anchor portion. If an external force operates on the beam portions when the masses (vibrators) are being driven in an anti-phase manner, the beam portions supporting the masses on the substrate receive compression and tensile stress. As a result, a resonant frequency changes according to temperature changes, the vibration characteristics of the sensor possess hysteresis and are non-linear, the accuracy of the sensor is decreased. For example, in the above-mentioned sensor having a plurality of anchors, as a distance exists between the anchors, a vibration on the driving side affects a vibration of the detecting side which detects the angular rate signal when an angular rate operates on the masses. The accuracy of the sensor is thus decreased.

U.S. Pat. No. 5,349,855, which corresponds to Japanese Patent Laid Open No. Hei. 7-218268, discloses an inertia rate sensor. The sensor has a rotational mass disposed on a silicon substrate, with the rotational mass is supported by two support beams extending in the x-direction. The vibrating mass is vibrated by a pair of driving electrodes disposed on both sides in the y-direction of the vibrating mass. Two pair of detecting electrodes are disposed on the substrate to detect the vibration about the x-direction when an angular rate operates the rotating mass in a driving mode. In this sensor, a non-movable point (a point which does not receives stress in the x, y, z directions) in the driving mode (a condition in which the mass is vibrating in the anti-phase manner) exists, but a non-movable point (a point which does not receives stress in the x, y, z directions) in the detecting mode (a condition occurring by the Coliolis force when the mass is vibrating in the anti-phase manner) does not exit. This thus causes decreasing accuracy of the sensor when a vibration leak occurs by the sensor structure, and an effect by an external force operates on the sensor.

For example, when the angular rate operates the mass about the z-direction, a Coriolis force is exerted on the mass as follows.

$$F = 2 m v \Omega$$

where:
F: Coliolis force
m: mass;
v: speed of the mass; and
Ω: angular rate

If the sensor has a vibration component decreasing the vibration by the Coliolis force in the driving mode, the accuracy of angular rate detecting signal may be inferior or affected even if an angular rate operates the sensor. The amplitude of the conventional vibration of the mass often becomes unstable when the vibration differs from the normal vibration direction (anti-phase manner).

In the angular sensor of U.S. Pat. No. 5,635,638, if a driving force operating the mass is not balanced by a dimensional fluctuation during manufacture, the vibration of the mass becomes unbalanced and non-linear vibration occurs. That is, by the unbalance of sift vibration of the resonant frequency, as unbalance fluctuation occurs, signal-to-noise ratio (SN ratio) of the angular rate will be inferior. As the mass of the driving mass corresponds to the mass of the detecting mass, if vibration in the detecting direction by the manufacturing dimensional fluctuation is generated in the driving mode, it causes the signal-to-noise ratio of angular rate signal to decrease. As the vibration in the driving mode leaks outward passing through the substrate, a vibration component reflected outward comes back into the substrate and its vibration is added to the usual vibration component, thus causing the signal-to-noise ratio of the angular rate signal to decrease. Also, as the driving signal vibrating the mass is transmitted to the detecting side, it causes the signal-to-noise ratio of the angular rate signal to decrease.

In light of the foregoing, a need exists for an angular rate sensor that is not susceptible to the same disadvantages and drawbacks as other known sensors.

SUMMARY OF THE INVENTION

According to one aspect of the present invention, an angular rate sensor includes a pair of masses located symmetrically with respect to a point on a plane for vibrating in a direction, a support beam connected to each of the masses so as to be substantially movable in the direction and located symmetrically with respect to the point, and a center anchor supporting the support beam at the point. A detecting device is located symmetrically with respect to the point and detects rotational vibration about the point when an angular rate perpendicular to the driving direction of the masses occurs. A connecting beam is located symmetrically with respect to the point and connects the detecting device, and a driving mechanism vibrates at least one of the masses in an antiphase manner.

When the mass is driven in the driving direction in an antiphase manner by the driving device, a vibration of the mass in the x-direction is transmitted to the mass via the support beam. When an angular rate about the z-axis (perpendicular to the x-direction) passing through the point operates the masses, each of the masses undergoes an elliptical vibration with a y-vibration component by virtue of Coliolis forces. As the masses vibrate in the anti-phase manner wit respect to each other, the connecting beam connecting the support beam receives a twisted vibration about the z-direction. The floating body thus vibrates with the twisted vibration about the z-direction to cancel the elliptical vibration of the masses. The twisted vibration proportional in magnitude to the angular rate is detected by a rotating vibration detecting device (a pair of displacement detecting electrodes).

As a pair of mass are located symmetrically with respect to the point, both masses are supported by the support beam, and the masses are vibrated in the x-direction in the anti-phase manner. In this condition, the support beams support the masses so as to be movable easily in the x-direction, and the masses are supported by the center anchor in a floating manner. T point is a center of gravity of the angular rate sensor and a non-movable point (a non-stress point in the x, y, z- directions) of the x-directional vibration. Functionally, as the floating body is separate from the vibrators, it is possible to regard the floating body as another body. As the floating body is connected to the masses by the connecting beams located symmetrically with respect to the point in the floating manner, the vibration of the masses in the x-direction is not substantially transmitted to the floating body, but the floating body vibrates with the twisted vibration about the z-direction. That is, the floating body vibrates about the z-axis. Quite advantageously, the signal-to-noise ratio of the angular rate signal may be improved as the x-directional vibration substantially does not act on the floating body. Also, the x-directional vibration may be stabilized as the angular sensor is supported on the substrate at the vibration center of the masses.

The distance from the point to the floating body is longer than the distance from the point to the mass, and the twisted vibration of the support beam is amplified by the connecting beams, and so the displacement of the twisted vibration of the floating body may be increased. As a result, the signal-to-noise ratio of the angular rate signal may be improved.

In preferred form of this invention, the floating body is ring-shaped and has a plurality of slits. The floating body is able to rotate about the center of the point, and is supported by the center anchor via the connecting beams and the support beams extending in the radial direction of the ring-shaped floating body. The angular sensor has a plurality (e.g., four) floating support beams located outwardly of the ring to connect the floating body in the floating manner, and four floating body anchors supporting the floating support beams on the substrate.

According to foregoing structure, this angular rate sensor is nevertheless supported by the anchors at many points, and the symmetry of the floating body with respect to the center point is not broken by heat expansion and internal stress. Therefore, the angular rate signal is improved.

As the floating body of the angular rate sensor vibrates with a balance, the vibration leak outwardly can be relatively low, and the signal-to-noise ratio of the angular rate signal may be improved. The connecting beams come to be electrically resistant when the masses are vibrating in the x-direction, and as the noise by the x-directional vibration driving pulse (signal) is decreased, the x-directional vibration driving pulse is not hardly transmitted to the floating body via the support beams and so the signal-to-noise ratio of the angular rate signal may be improved. Further, as the support beams between the masses may become electrically resistant, it is possible to decrease the noise based on the x-directional vibration driving pulse from the driving mechanism transmitted to the vibration detecting electrodes detecting the x-directional displacement of the mass.

According to another aspect of the invention, an angular rate sensor includes a pair of masses located symmetrically with respect to a point on a plane for vibrating in a driving direction, a detecting mechanism located symmetrically with respect to the point for detecting rotational vibration about the point when an angular rate perpendicular to the driving direction of the masses occurs, and a driving device for vibrating at least one of the vibrators in an anti-phase manner during a driving mode. A center anchor supports the masses at a non-movable point of the sensor when the masses are vibrating and at a non-movable point of the sensor when an angular rate perpendicular to the driving direction of the masses occurs in the driving mode.

BRIEF DESCRIPTION OF THE DRAWING FIGURES

Additional features and characteristics of the present invention will become more apparent from the following detailed description considered with reference to the accompanying drawing figures in which like elements are designated by like reference numerals and wherein.

DETAILED DESCRIPTION OF THE PREFERRED EMBODIMENT

Figure 1:
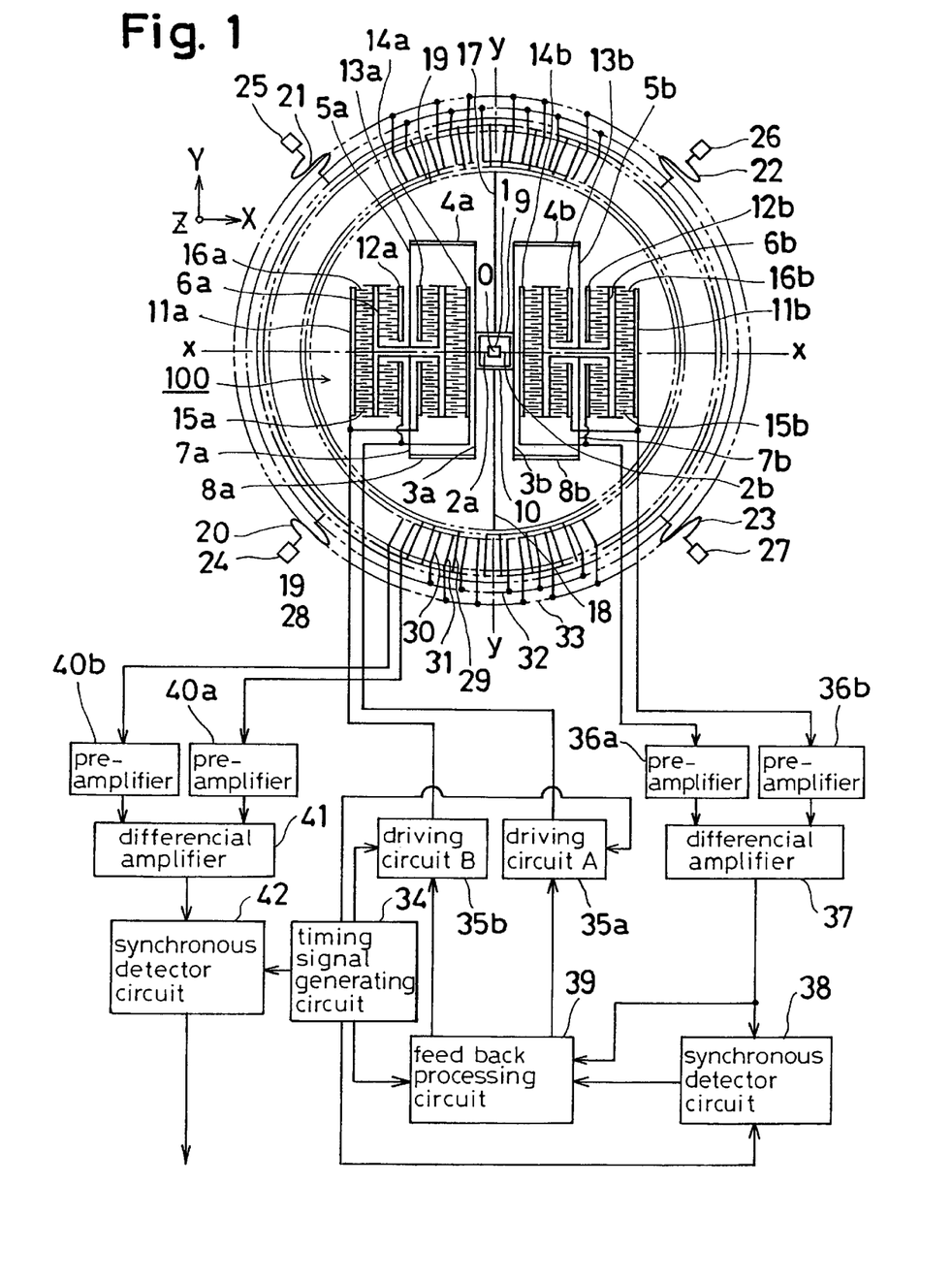
FIG. 1 is a plan view of an embodiment of the angular rate sensor of the present invention, including the driving and detecting circuits.

FIG. 1 shows an embodiment of an angular rate sensor of the present invention. Referring to FIG. 1, the angular rate sensor includes a center anchor 1, anchors for fixed-electrodes 11a, 12a, 13a, 14a, 11b, 12b, 13b, 14b, anchors for angular rate detecting electrodes 30, 31, and floating body anchors 24, 25, 26, 27, which are made of polysilicon containing an impurity for imparting conductivity (hereinafter referred to as conductive polysilicon). These anchors are joined to a silicon substrate 100 that is formed with an insulating layer. The electrodes 13a, 14a represent one pair of driving electrodes and the electrodes 13b, 14b represent another pair of driving electrodes. The electrodes 12a, 16a represent one pair of vibration detecting electrodes and the electrodes 12b, 16b represent another pair of vibration detecting electrodes. The pair of driving electrodes 13a, 14a and 13b, 14b, the pair of vibration detecting electrodes 12a, 16a and 12b, 16b, and a pair of angular rate electrodes (displacement detecting electrodes) 30, 31, all of which are semiconductor films made of conductive polysilicon, form connected connection electrodes (solid squares) via wiring lines, etc. that are formed on the insulating layer of the silicon substrate 100.

This angular rate sensor is formed with a pair of x-direction beams 2a, 2b floated from the silicon substrate 100 in the x-direction by a semiconductor micro-machining technique using lithography, with the x-direction beams 2a, 2b being made of conductive polysilicon. The x-direction beams 2a, 2b extend in the x-direction and have one end connected with the center anchor 1 and the opposite end connected with a square shaped rigid body 9, 10. The sensor also includes y-direction beams 17, 18 extending in the y-direction and connected with the rigid body 9, 10. The x-direction beams 2a, 2b move easily in the y-direction, but do not move substantially in the x-direction, and the y-direction beams 3a, 3b move easily in the x-direction, but do not move substantially in the y-direction.

The center anchor 1 is made of conductive polysilicon and is electrically connected to a conductive polysilicon layer of the substrate 100. The center anchor 1 has a head portion 1h and a leg portion 11 in the z-direction, with the head portion 1h being wide in the xy-plane, and the leg portion 11 being smaller than the head portion. Also the x-direction beams 2a, 2b formed by the conductive polysilicon connect with the head portion 1h of the center anchor 1. As noted above, these beams 2a, 2b also connect with the rigid body 9, 10 consisting of conductive polysilicon. The rigid body 9, 10 has a square shape, and the center point 0 of the center anchor 1 exists at the center (a point of intersection of two diagonals) of the rigid body 9, 10. The x-direction beams 2a, 2b are symmetrically located on the x-axis passing through the center point 0, and the y-direction beams 3a, 3b consisting of conductive polysilicon and extending in the y-direction connect with each corner of the rigid body 9, 10.

As shown in FIG. 1, the support beam or support structure of the sensor comprises the x-direction beams 2a, 2b, the y-direction beams 3a, 3b, the rigid body 9, 10, several additional x-direction beams 4a, 8a, 4b, 8b, and several additional y-direction beams 5a, 7a, 5b, 7b. The y-direction beam 3a extending in the y-direction from the corner of the rigid body 9, 10 is rigidly connected in the x, y direction with one end of the x-direction beams 4a, 8a. The other end of each of the x-direction beams 4a, 8a is connected with one end of a respective y-direction beam 5a, 7a having highly flexibility in the x directions. The opposite ends of the y-direction beam 5a, 7a are connected with the center (a center of gravity point) of an H-shaped mass 6a.

Similarly, The y-direction beam 3b extending in the y-direction from the corner of the rigid body 9, 10 is rigidly connected in the x, y directions with one end of the x-direction beams 4b, 8b. The opposite end of each of the x-direction beams 4b, 8b is connected with one end of a respective y-direction beam 5b, 7b having high flexibility in the x direction. The opposite end of each of the y-direction beams 5b, 7b is connected with a center (a center of gravity point) of an H-shaped mass 6b. These elements float with respect to the silicon substrate 100, and are supported by the center anchor 1 at the center point O.

The H-shaped masses 6a, 6b are symmetrically shaped with respect to the x-axis passing through the center point O so that the shape of each mass is symmetrical with respect to the xz plane as shown in FIG. 1. As also shown in FIG. 1, the H-shaped masses are symmetrically disposed with respect to and on either side of the yz plane. Also the y-direction beams 3a, 3b are symmetrical in shape with respect to the xz plane and are symmetrically disposed with respect to and on either side of the yz plane. Similarly, the x-direction beams 2a, 2b are symmetrical in shape with respect to the yz plane and are symmetrically disposed with respect to and on either side of the xz plane. The rigid body 9, 10 operates stabilized in the x-directional vibration when the masses 6a, 6b are vibrating in the x-direction.

In this embodiment, the H-shaped mass 6a has a plurality of electrodes 15a forming floating comb finger electrodes extending in the x-direction that consist of conductive polysilicon. The electrodes 15a are parallel with the substrate 100 and extend in the y-direction. The electrodes 15a are positioned at a constant pitch or constant spacing and project from the mass 6a in both the leftward and rightward x-direction as seen with reference to FIG. 2.

Figure 2:
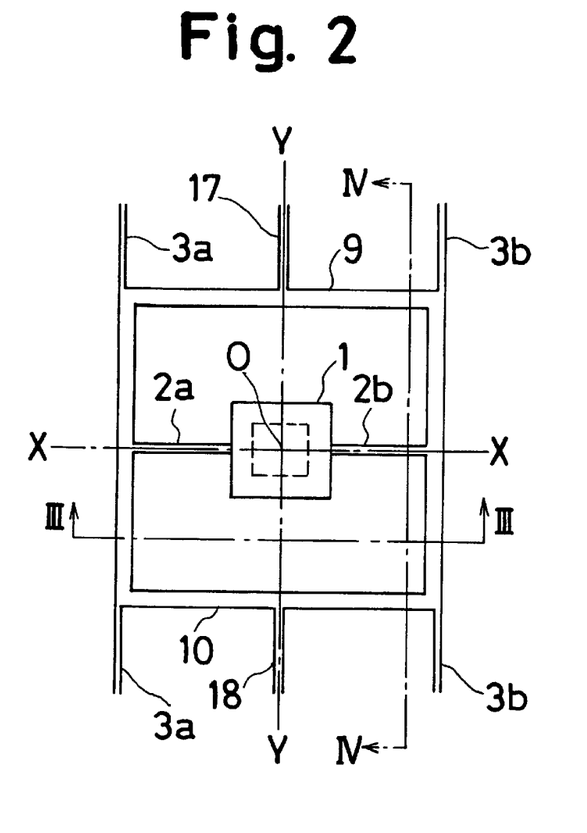
FIG. 2 is an enlarged plane view of the center portion of the angular rate sensor shown in FIG. 1.
Figure 3:
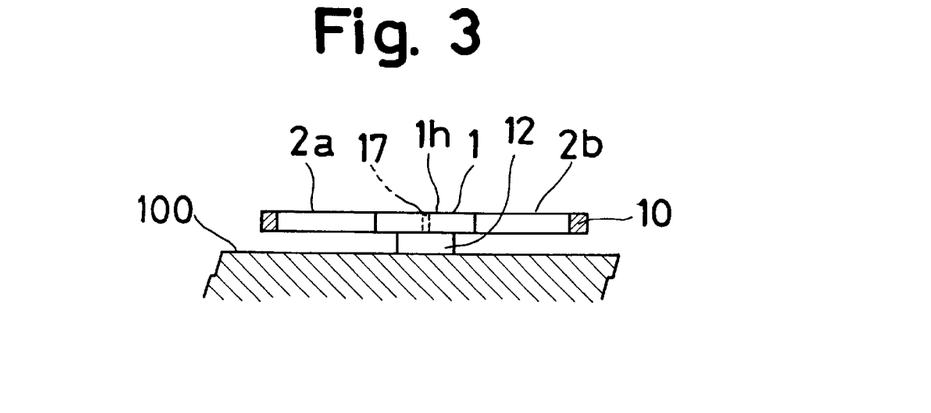
FIG. 3 is an enlarged cross-sectional view taken along the section line III—III in FIG. 2.
Figure 4:
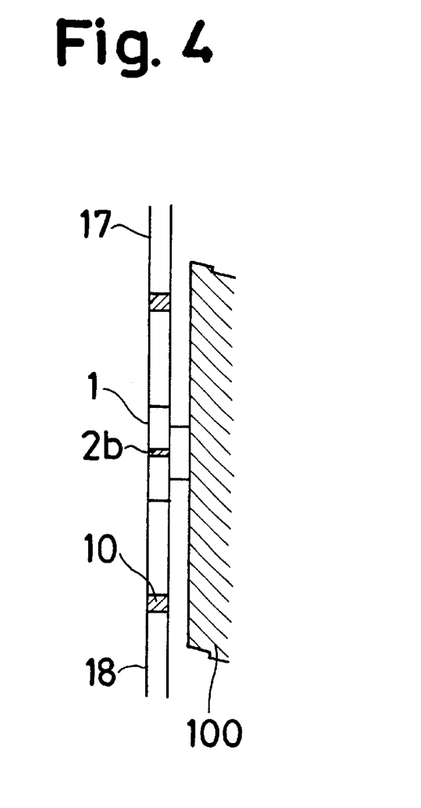
FIG. 4 is an enlarged cross-sectional view taken along the section line IV—IV in FIG. 2.

Two sets of driving electrode devices forming fixed comb finger electrode devices 11a, 12a, 13a, 14a are disposed in opposition to the mass 6a in the x-direction. Two of the driving electrode devices 11a, 13a form one set of driving electrode devices and are positioned in opposition to the two legs of the H-shaped mass 6a along one side of the legs, while the other two driving electrode devices 12a, 14a form another set of driving electrode devices positioned in opposition to the two legs of the H-shaped mass 6a on the opposite side of the legs from the electrodes 11a, 13a. The driving electrode devices 11a, 12a, 13a, 14a include projecting electrodes or fixed comb finger electrodes 16a that each project into respective spaces between the floating comb finger electrodes 15a of the mass 6a. That is, one floating comb finger electrode 15a is interposed in the gap between two adjacent fixed comb finger electrodes 16a, with these interdigitated comb finger electrodes or parallel plate electrodes being used to drive the mass 6a electrostatically in the x-direction. The fixed comb finger electrodes 16a are arranged in the y-direction and are spaced apart at equal intervals corresponding to the spacing of the floating comb finger electrodes 15a. The electrodes 15a project in the x-direction.

Similarly, the mass 6b has a plurality of electrodes forming floating comb finger electrodes 15b consisting of conductive polysilicon. The floating comb finger electrodes 15b project in the x-direction, are parallel with the substrate 100, are spaced apart from one another in the y-direction at a constant pitch, and project from the mass 6b in the leftward and rightward x-direction with reference to the illustration in FIG. 1.

Two sets of vibration detecting electrode devices or fixed comb finger electrode devices 11b, 12b, 13b, 14b electrically connecting the anchors of the vibration detecting electrodes 11b–14b are disposed in opposition to the mass 6b in the x-direction. Two of the vibration detecting electrode devices 11b, 13b form one set of vibration detecting electrode devices and are positioned in opposition to the two legs of the H-shaped mass 6b on one side of the legs, while the other two vibration detecting electrode devices 12b, 14b form another set of vibration detecting electrode devices positioned in opposition to the two legs of the H-shaped mass 6b on the side of the legs opposite the electrodes 11b, 13b. The vibration detecting electrode devices 11b, 12b, 13b, 14b include vibration detecting electrodes 16b that project in the x-direction into the space between adjacent pairs of the floating comb finger electrodes 15b of the mass 6b. That is, one floating comb finger electrode 15b is interposed in the gaps between two fixed comb finger electrodes 16b. These interdigitated comb finger electrodes or parallel plate electrodes are used for detecting the vibration of the mass 6b electrostatically in the x-direction.

In this embodiment, the driving electrodes are designated as 11a, 13a and 12a, 14a, and the vibration detecting electrodes are designated as 11b, 13b and 12b, 14b. However, in alternative embodiments, it is possible to exchange or change the arrangement of these electrodes 11–14. For example, the driving electrodes can consist of the electrodes 13a, 13b and 14a, 14b, and the vibration detecting electrodes can consist of the electrodes 11a, 11b and 12a, 12b. Another alternative would involve the driving electrodes being the electrodes 12a, 12b and 16a, 16b, and the vibration detecting electrodes being the electrodes 13a, 13b and 14a, 14b. Other alternatives are also possible In the construction of the electrodes described above and shown in FIG. 1, each floating comb finger electrode 15a of the mass 6a is correctly located at the center of the gap between the two fixed comb finger electrodes 16a of the driving electrodes 11a, 13a and 12a, 14a, and the pairs of fixed comb finger electrodes 16a exert electrostatic attractive forces, respectively, in the y-direction having the same absolute value and opposite directions to the one floating comb finger electrode 15a.

If the driving electrodes are the electrodes 11a, 13a, 12a, 14a, by supplying voltages of higher level than the electric potential level of the mass 6a alternately for the driving electrodes 11a, 13a and 12a, 14a, the mass 6a comes to vibrate in the x-direction. In this condition, the x-directional vibration of the mass 6a is slightly transmitted to the mass 6b via the support beam 2a-5a, 7a, 8a and 2b–5b, 7b, 8b and the rigid body 9, 10. However, the mass 6b comes to vibrate largely at a resonant frequency in the x-direction when a frequency of the x-directional vibration corresponds to a resonant frequency of the vibrator 6b and the support beam 2b–5b, 7b, 8b (a vibration side). As a result, the two masses 6a, 6b vibrate in the anti-phase manner, and act on a tuning fork vibration at the resonant frequency, x-vibration of high efficiency in the energy consumption.

As the mass or vibrator 6b vibrates in the x-direction, a capacitance between the vibrator 6b and the fixed comb finger electrodes (vibration detecting electrodes) 12b 14b fluctuates, and a capacitance between the vibrator 6b and fixed comb finger electrodes 11b 13b fluctuates.

As the center anchor 1 is located at a middle point between the masses 6a 6b, and is located at a neutral point with respect to the x-directional vibration of the vibrators or masses 6a, 6b and with respect to a resonant tuning fork vibration of the masses 6a, 6b, the center anchor 1 becomes a stationary point which is non-movable (i.e., there is no stress in the x, y, z directions) when the masses 6a, 6b are vibrating in the anti-phase manner and which is non-movable (i.e., there is no stress in the x, y, z directions) when an angular rate in the z-direction occurs while the masses 6a, 6b are vibrating in the x-direction. Therefore, the masses 6a, 6b are supported by the center anchor 1 at the stationary point.

One end of each of the connecting beams 17, 18 is connected to a middle point (i.e., a neutral point that does not vibrate in the x-direction with respect to the resonant tuning fork vibration) of the x-direction beams 9, 10 forming the rigid frame while the other end of each of the connecting beams 17, 18 is connected to a circular or annular ring-shaped floating body 19. These elements float with respect to the silicon substrate 100. The floating body 19 is supported by the connecting beams 17, 18. The connecting beams 17, 18 extend in the y-direction and have axes passing through the center point 0. Four support beams 20, 21, 22, 23 are connected at one of their ends to the outer surface of the floating body 19, while the opposite end of each support beam 20, 21, 22, 23 is connected to a respective floating body anchor 24, 25, 26, 27.

In the xy-plane, the floating support beams 20, 21, 22, 23 possess an approximate S-shape, easily rotated or moved in the x-direction and y-direction, and rigid in the z-direction. The floating support beams, 20, 21, 22, 23 restrain twisting rotation about the connecting beams 17, 18 of the floating body 19, and maintain a parallel orientation in connection with the substrate 100. The floating beams 20, 21, 22, 23 vibrate easily in the x, y-directions, and the connecting beams 17, 18 bend or twist easily about the center point O. Also the connecting beams 17, 18, with the floating body are made of conductive polysilicon, and with substantially an electric potential level of the center anchor 1 being equal to the anchors 24–27.

Figure 5:
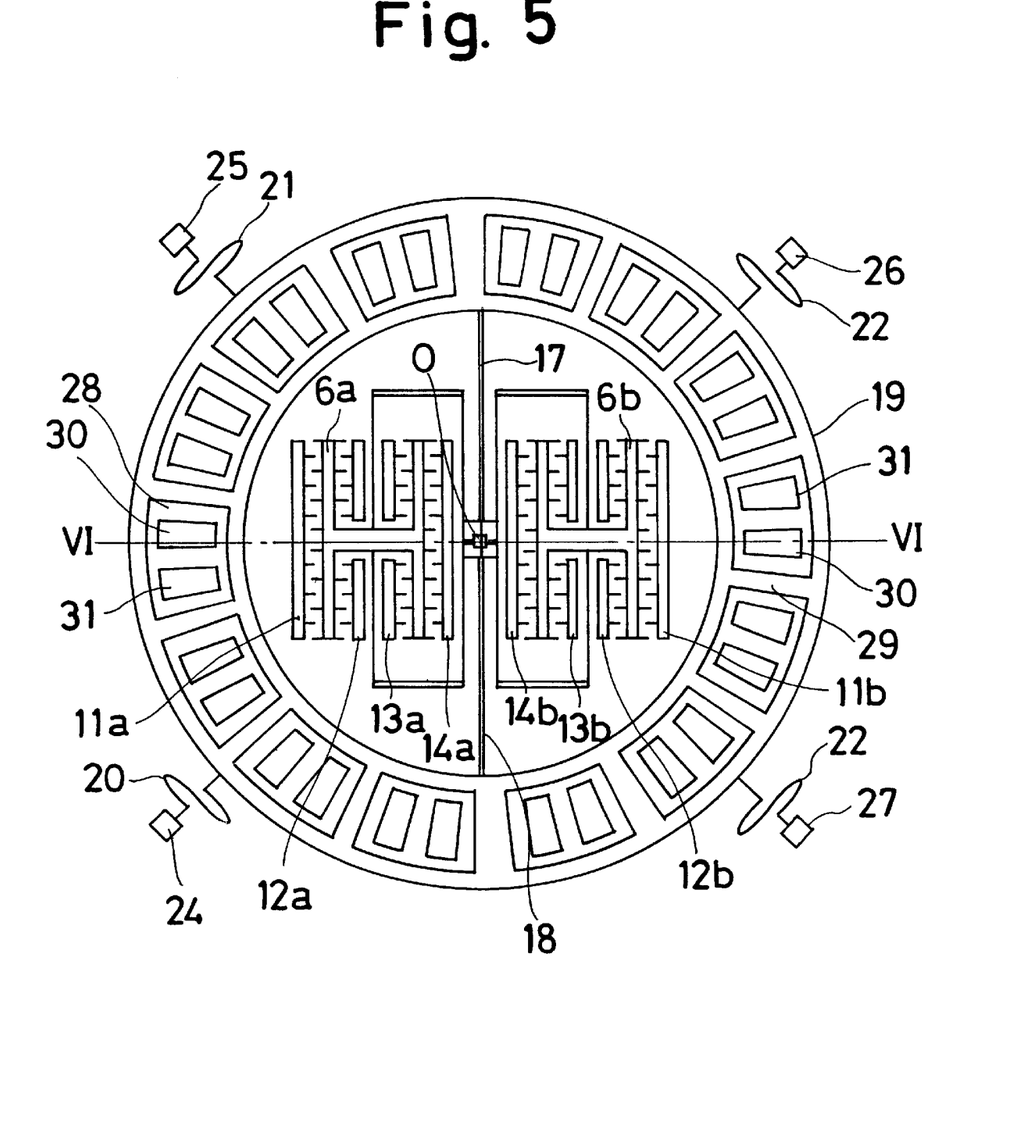
FIG. 5 is a plan view of the angular rate sensor of the present invention showing the pairs of driving and detecting electrodes.
Figure 6:
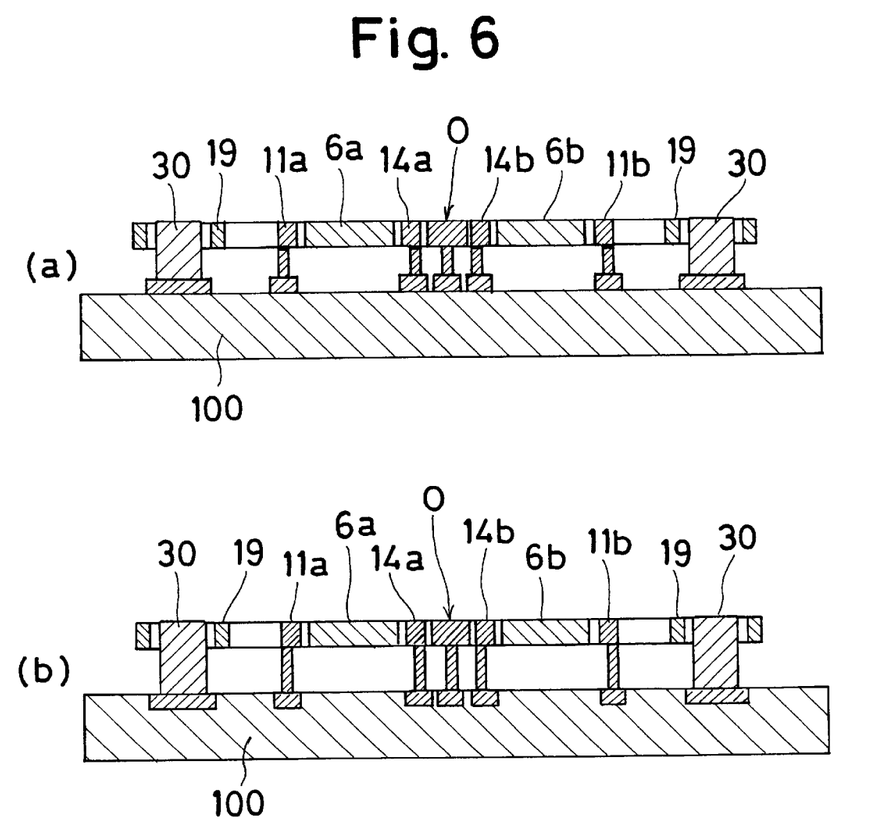
FIGS. 6a and 6b are cross-sectional views taken along the section line VI—VI in FIG. 5.

As seen in FIG. 1 and FIG. 5, the floating body 19 is provided with a plurality of slits or openings 28 arranged at a constant pitch in the circumferential direction and a plurality of cross beams 29 positioned between and separating the adjacent pairs of slits 28. Each slit 28 is thus bounded by a pair of cross beams 29 as well as inner and outer portions of the annular floating body 19. A pair of angular rate detecting electrodes forming displacement detecting electrodes 30, 31 that consist of conductive polysilicon are disposed in the space formed by each slit 28. The displacement detecting electrodes 30, 31 are formed on the substrate 100, and project into the respective slits 28 of the floating body 19, with each of the displacement detecting electrodes 30, 31 electrically connected with the anchor shown in FIGS. 6(a) and 6(b). FIG. 6(a) shows a cross sectional view taken along the line VI—VI in FIG. 5 using polysilicon wiring lines while FIG. 6(b) shows a cross-sectional view using diffusion wiring lines Though the displacement detecting electrodes 30, 31 are insulated from each other on the polysilicon substrate 100, the displacement detecting electrodes 30, 31 connect with the wire lines 32, 33 respectively so as to detect the rotation about the z-axis passing through the point O.

When the masses 6a, 6b are vibrating at a resonant tuning fork frequency in the x-direction, and an angular rate of rotation about the z-axis passing through the point O acts on the masses 6a, 6b, the masses 6a, 6b receive a Coriolis force so that the masses 6a, 6b vibrate with a y-component (elliptical vibration). The support beam 2a, 3a, 4a, 5a, 7a, 8a and 2b, 3b, 4b, 5b, 7b, 8b twist about the z-axis passing through the center point 0, and the connecting beams 17, 18 having a high flexibility bend and twist about the z-axis passing through the point O. As a result, the floating body 19 vibrates in a twisted manner about the z-axis passing through the point 0 so as to cancel the elliptical vibration of the masses 6a, 6b.

In above-mentioned angular rate sensor, the sensor's electrodes (the driving electrodes 11a, 13a and 12a, 14a, the vibration detecting electrodes 11*b*, 13*b* and 12*b*, 14*b*, and the displacement detecting electrodes) are connected to angular rate detecting circuits 34–42. The angular rate detecting circuits include a timing signal generating circuit 34 that generates a driving pulse signal to vibrate the mass 6*a* in the anti-phase manner. The mass 6*a* is vibrated in the x-direction at a resonant frequency by the signal, the driving pulse signal (which drives the mass 6*a* in the x-direction) is supplied by the driving circuits 35*a*, 35*b*, and the timing signal generating circuit 34 supplies a synchronous signal used for synchronous detection to two synchronous detector circuits 38, 42.

Figure 7:
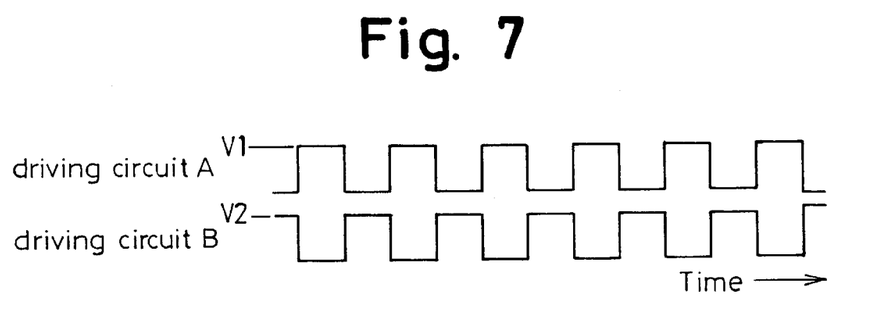
FIG. 7 is a time chart showing wave-forms of output voltages of the driving circuit shown in FIG. 1.

FIG. 7 shows a timing chart with the wave-forms of output voltages of the driving 35*a*, 35*b*. The driving signal from the driving circuit 35*b* is supplied to the driving circuit electrodes 11*a*, 13*a*, while at the same time the driving signal from the driving circuit 35*a* is supplied to the driving electrodes 12*a*, 14*a*. These signals are synchronized with the driving pulse signal. Thus, the mass 6*a* is driven by an electrostatic attraction in the x-direction, and the mass 6*b* vibrates in the x-direction. But the x-directional vibration is rather small and non-stabilized when a frequency of the x-directional vibration differs from the actual resonant frequency of the sensor. When the mass 6*b* vibrates in the x-direction, the capacitance between the vibration detecting electrodes 11*b*, 13*b* and 14*b*, 12*b* and the electrodes 15*b* of the mass 6*b* vibrate in the anti-phase manner. A differential amplifier 37 amplifies the capacitance signal which is generated from pre-amplifiers 36*a*, 36*b* in a differential manner and doubles the signal level of the capacitance signal generated by the pre-amplifier. The differential amplifier 37 generates the differential signal which counterbalances the noise, and supplies the differential signal to the synchronous detector circuit 38 and a feedback processing circuit 39. The synchronous detector circuit 38 detects the x-vibration detecting voltage which represents the x-directional vibration (the differential signal of the differential amplifier 37) in synchronization with the driving pulse, generates a signal representing a phase lag of the x-directional vibration, and supplies the phase lag signal to the feedback processing circuit 39.

The feedback processing circuit 39 supplies a moving phase signal due to the corresponding phase lag signal level from the synchronous detector circuit 38 to a predetermined value with the driving circuits 35*a*, 35*b*. The driving circuits 35*a*, 35*b* receiving the moving phase signal shifts the phase of the output driving voltages VI, V2 for the driving pulse signal corresponding to the moving phase signal. The resonant tuning fork vibration comes to be stabilized when the phase lag signal level of the synchronous detector circuit 38 becomes substantially a predetermined value.

When an angular rate or turning force acts on the masses 6*a*, 6*b* about z-axis passing through the center point O at the resonant frequency (stabilized resonant tuning fork vibrations), it causes the floating body 19 to experience a rotating vibration. In this condition, the amplitude of rotation of the floating body 19 corresponds with an absolute value of the angular rate.

A capacitance is detected by a pair of the displacement detecting electrodes 30, 31 detecting the rotating vibration of the floating body 19 vibrating in the anti-phase manner by the rotating vibration. The pre-amplifiers 40*a*, 40*b* generate a capacitance signal, and the differential amplifier 41 doubles the signal level of the pre-capacitance amplifier's output (capacitance signal), generates a differential signal counterbalancing the noise, and supplies its signal to the synchronous detector circuit 42. The synchronous detector circuit 42 detects the vibration detecting voltage which represents the rotating vibration (the differential signal which is generated by the differential amplifier 41), and generates a signal representing the angular rate. A polarity (±) of the angular rate signal represents the acting direction of the angular rate, and an absolute value of the signal level represents the magnitude of the angular rate.

According to the structure of the above-described sensor of the present invention, the angular rate sensor does not depress the vibration forcedly as is the case with other known sensors, and the sensor is not susceptible to the adverse affects of stress and a temperature deformation. The non-movable points of vibration in both the driving and detecting modes corresponds to the center of gravity of the angular rate sensor, with a stationary point of the angular rate sensor existing at the center of gravity of the sensor. The angular rate sensor of the present invention thus exhibits an improved signal-to-noise ratio as compared to other known sensors as the vibration from outside of the sensor does not practically effect the driving and detecting vibrations. In a situation where an acceleration or a deceleration has acted in the y-direction, the resulting movements of the masses 6*a*, 6*b* and the floating body 19 are in the same sense, and the levels of the displacement signals of the displacement detecting electrodes 30, 31 fluctuate to the same extent in the same sense. When the displacement detecting signals are differentially amplified, fluctuations in the signal levels are canceled form each other. Accordingly, the signal-to-noise ratio of the angular rate is not degraded by disturbances such as acceleration. This angular rate sensor is able to reduce the effect of the heat expansion caused by temperature and the like and so temperature adjustment may be unnecessary. That is, compared with other known sensors, the angular rate signal of high signal-to-noise ratio is obtained at a high level.

Further, the center of gravity of the masses 6*a*, 6*b* is supported by the y-direction beams 5*a*, 7*a* and 5*b*, 7*b*, spring deformation of the masses 6*a*, 6*b* due to deformation of the mass itself does not have a substantial affect, and the x-directional vibration of the masses 6*a*, 6*b* achieves a single mode vibration.

Because the sensor makes the masses 6*a*, 6*b* vibrate at a resonant tuning fork vibration, the sensor is able to be driven with relatively less energy and may be made at a relatively low cost using a semiconductor micro-machining technique, with an improved signal-to-noise ratio as the level of the displacement output signal becomes large.

As the non-movable point of the resonant tuning fork vibration of the masses 6*a* is the center of gravity of the sensor, the masses 6*a*, 6*b* are supported at the center of gravity O (a point ). Thus, the vibration leak in the x-directional vibration does not occur on principle, and the amplifier ratio of the detecting vibration may be increased. The signal-to-noise ratio may be improved as unnecessary vibration with respect to the detecting vibration is not generated, and unnecessary vibration with respect to the driving vibration is not generated.

A stress load at the beam portions 2*a*, 3*a*, 4*a*, 5*a*, 7*a*. 8*a* and 2*b*, 3*b*, 4*b*, 5*b*, 7*b*, 8*b* does not occur by the effect of heat expansion associated with temperature, and the temperature characteristic may be improved as the center of gravity of the x-vibration line corresponds with the detecting vibration line. The stability of the angular rate detecting may be increased when this angular rate sensor is used in an environment in which temperature fluctuations are large (for example, in a vehicle, etc.).

A vibration leak also does not occur as the beam portions 2a–7a, 2b–7b are formed as a folded shape, and a frequency of the twisted vibration at the beam portion is set on a low frequency. Also, the stress load at the beam point by the effect of the heat expansion due to temperature does not occur, and so the temperature characteristic of the sensor may be improved. Further, compared with other known sensors, the external form of the sensor may be made small and so the manufacturing cost may be relatively low.

The rotating fluctuation of the floating body 19 comes to be large based on a lever principle. The signal-to-noise ratio of the angular rate signal may be improved as the masses 6a, 6b are disposed in the inner space of the ring-shaped floating body 19, with a radius of the floating body 19 being longer than the distance from the center point 0 to the masses 6a, 6b.

The sensor of the present invention may be manufactured at a low cost as this sensor is able to be manufactured on a silicon wafer by a semiconductor micro-machining process using lithography. This sensor may be made of a plate by etching etc., is easily formed by a semiconductor micro-machining process, and is capable of being manufactured at a low cost.

The principles, preferred embodiment and mode of operation of the present invention have been described in the foregoing specification. However, the invention which is intended to be protected is not to be construed as limited to the particular embodiment described. Further, the embodiment described herein is to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the invention be embraced thereby.

What is claimed is:

1. An angular rate sensor comprising:
   a pair of masses located symmetrically with respect to a point on a x-y plane and adapted to vibrate in the x-direction;
   a support beam connected to each of the masses for movement in the x-direction, and located symmetrically with respect to said point;
   a center anchor for supporting the support beam at said point;
   detecting means located symmetrically with respect to said point for detecting rotational vibration about said point when an angular rate perpendicular to a driving direction of the masses occurs;
   a connecting beam located between said masses symmetrically with respect to said point, one end of the connecting beam being operatively connected to said support beam and the other end of the connecting beam being operatively connected to said detecting means; and
   driving means for vibrating at least one of the masses in an anti-phase manner.

2. The angular rate sensor according to claim 1, including a floating support beam for supporting the detecting means in a floating manner, and a floating body anchor for supporting the floating support beam on a substrate.

3. The angular rate sensor according to claim 1, wherein the detecting means includes a floating body and a displacement detecting electrode located on the substrate.

4. The angular rate sensor according to claim 3, wherein the floating body is ring-shaped with a slit being formed in the floating body.

5. The angular rate sensor according to claim 4, wherein the displacement detecting electrode is disposed in the slit.

6. The angular rate sensor according to claim 5, wherein the connecting beam extends in a radial direction of the floating body.

7. The angular rate sensor according to claim 1, wherein the masses, the support beam, the center anchor, the detecting means, the connecting beam, and the driving means are all semiconductor films made of conductive polysilicon.

8. An angular rate sensor comprising:
   a pair of masses located symmetrically with respect to a point on a x-y plane for vibrating in a driving direction in the x-direction;
   a support beam connected to the masses for movement in the x-direction;
   detecting means located symmetrically with respect to said point for detecting rotational vibration about said point when an angular rate perpendicular to the driving direction of the masses occurs;
   driving means for vibrating at least one of the masses in an anti-phase manner during a driving mode;
   a connecting beam located between the masses symmetrically with respect to said point, one end of the connecting beam being operatively connected to the support beam and the other end of the connecting beam being operatively connected to the detecting means; and
   a center anchor supporting the masses at a non-movable point of the sensor when the masses are vibrating and at a non-movable point of the sensor when an angular rate perpendicular to the driving direction of the masses occurs in the driving mode.

9. The angular rate sensor according to claim 8, wherein the detecting means includes a floating body and a displacement detecting electrode supported on a substrate.

10. The angular rate sensor according to claim 9, wherein the floating body rotates about said point when the angular rate occurs, the displacement detecting electrodes detecting a capacitance in proportion to a magnitude of the angular rate between the floating body and the displacement detecting electrodes.

11. An angular rate sensor comprising:
    a support situated at a center of gravity of the sensor;
    a pair of masses supported on said support and situated on opposite sides of said center of gravity for being driven in a driving direction;
    a support beam connected to each of the masses for movement in a x-direction;
    detecting means located symmetrically with respect to said center of gravity for detecting rotational vibration about said center of gravity when an angular rate perpendicular to the driving direction of the masses occurs;
    a connecting beam located between the masses, with one end of the connecting beam being operatively connected to the support beam and the other end of the connecting beam being operatively connected to the detecting means; and
    driving means for vibrating at least one of the masses in the driving direction in an anti-phase manner during a driving mode.

* * * * *